United States Patent [19]

Suzuki et al.

[11] Patent Number: 4,516,835

[45] Date of Patent: * May 14, 1985

[54] LIQUID CRYSTAL DISPLAY SYSTEM

[75] Inventors: Ryoichi Suzuki, Kanagawa; Seiichi Matsumoto, Yokohama; Takashi Amikura, Tokyo; Tokuichi Tsunekawa; Takashi Uchiyama, both of Yokohama, all of Japan

[73] Assignee: Canon Kabushiki Kaisha, Tokyo, Japan

[*] Notice: The portion of the term of this patent subsequent to Feb. 20, 1996 has been disclaimed.

[21] Appl. No.: 5,763

[22] Filed: Jan. 23, 1979

Related U.S. Application Data

[63] Continuation of Ser. No. 768,432, Feb. 14, 1977, abandoned.

[30] Foreign Application Priority Data

Feb. 17, 1976 [JP] Japan .................................. 51-16296
Feb. 20, 1976 [JP] Japan .................................. 51-17756
Feb. 24, 1976 [JP] Japan .................................. 51-19136

[51] Int. Cl.$^3$ ............................................... G02F 1/13
[52] U.S. Cl. ...................................... 350/336; 350/332
[58] Field of Search ................................. 350/336, 332

[56] References Cited

U.S. PATENT DOCUMENTS

| | | | |
|---|---|---|---|
| 3,774,195 | 11/1973 | Schulthess et al. | 350/336 X |
| 3,877,790 | 4/1975 | Robinson | 350/336 X |
| 3,944,330 | 3/1976 | Tsunoda et al. | 350/336 |
| 4,030,109 | 6/1977 | Hecker et al. | 350/336 X |
| 4,139,278 | 2/1979 | Matsumoto et al. | 350/332 |
| 4,140,378 | 2/1979 | Suzuki et al. | 350/331 R X |
| 4,142,786 | 3/1979 | Suzuki et al. | 350/331 R X |
| 4,299,462 | 11/1981 | Suzuki et al. | 350/336 X |

FOREIGN PATENT DOCUMENTS 2247525 4/1974 Fed. Rep. of Germany ...... 350/336

Primary Examiner—John K. Corbin
Assistant Examiner—Richard F. Gallivan
Attorney, Agent, or Firm—Toren, McGeady and Stanger

[57] ABSTRACT

In the disclosed liquid crystal display system, one of two opposing base plates that sandwich an electrooptic liquid crystal between them is divided into separate electrodes or constitutes a homogeneous transparent resistance. A source of power energizes this electrode so as to produce a gradient or stepped voltages between the divisions, and a data voltage is applied to the other electrode so that one section of the sandwiched electrodes can effect light differently than the other sections and thereby display information.

15 Claims, 19 Drawing Figures

FIG.3
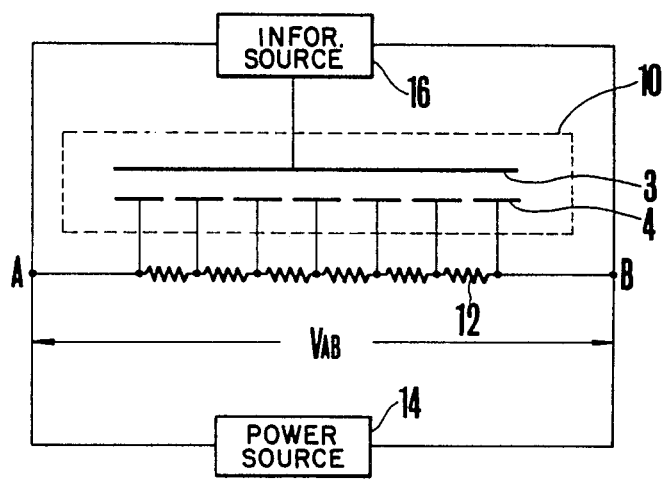
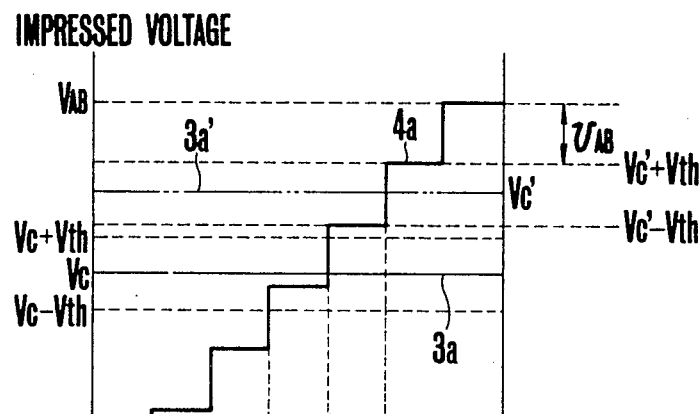
FIG.4a
FIG.4b
FIG.4c
FIG.4d
FIG.4e

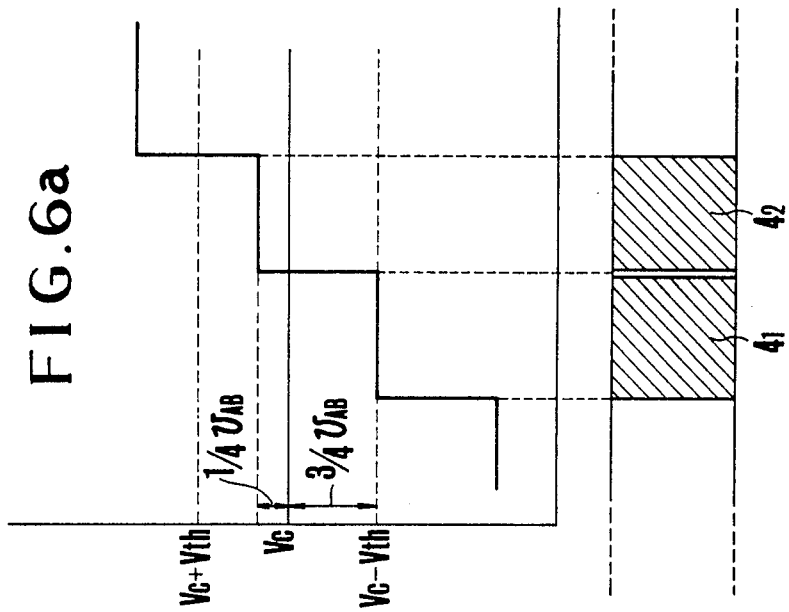
FIG.6a
FIG.6b
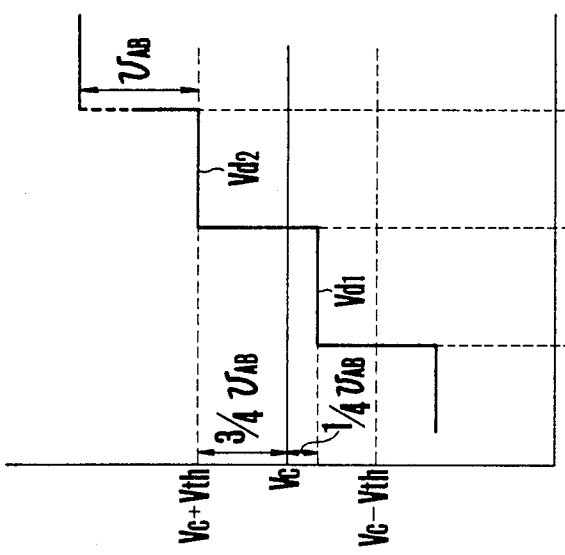
FIG.5a
FIG.5b (a)

FIG.16a
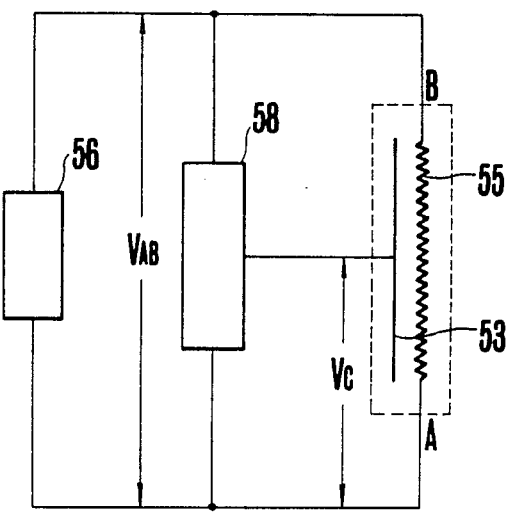
IMPRESSED VOLTAGE
FIG.16b
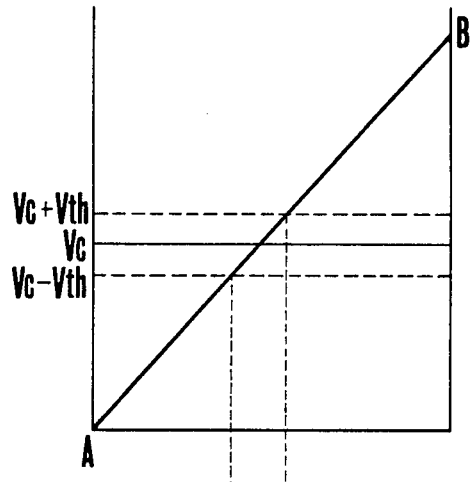
FIG.16c
FIG.16d
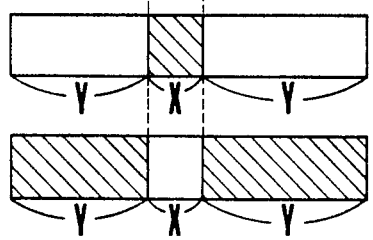

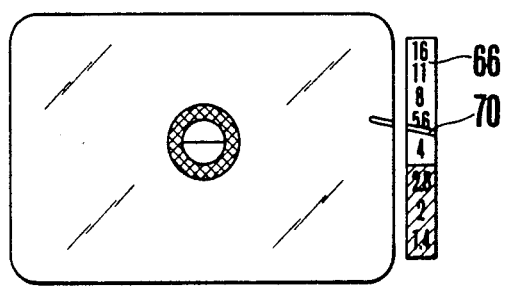
F I G.18a
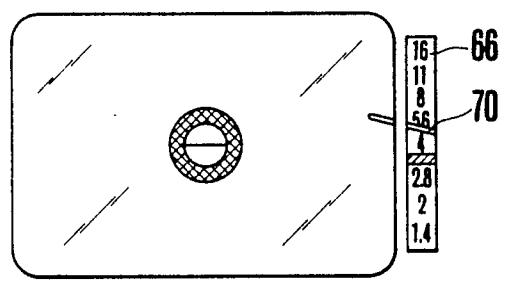
F I G.18b
F I G.19
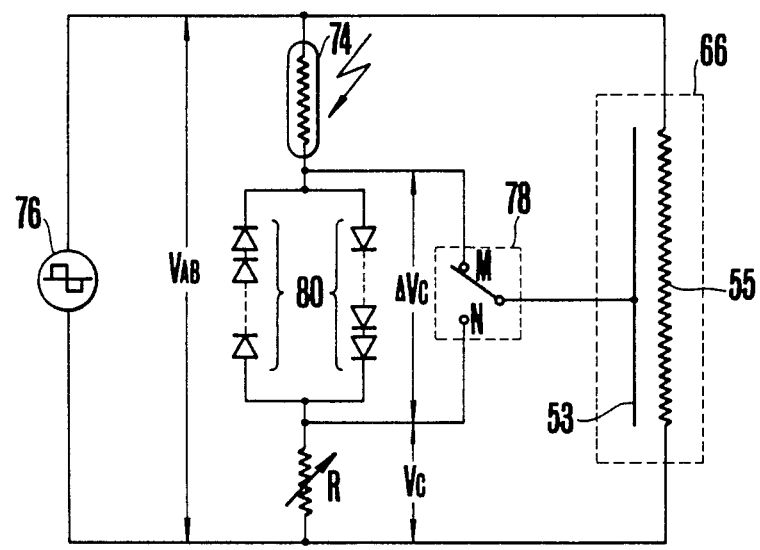

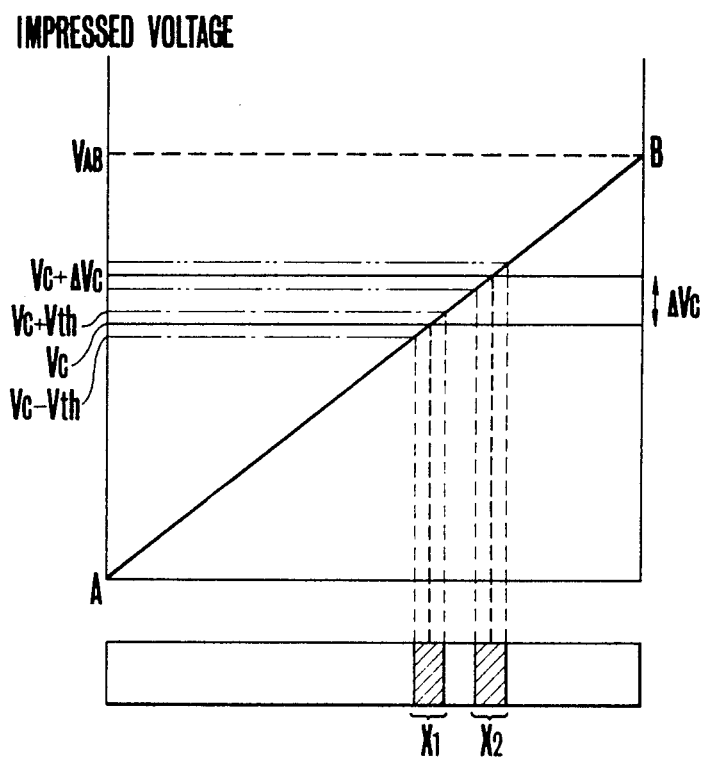
FIG.20a
FIG.20b
FIG.21
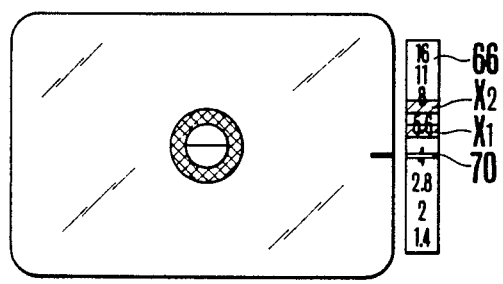

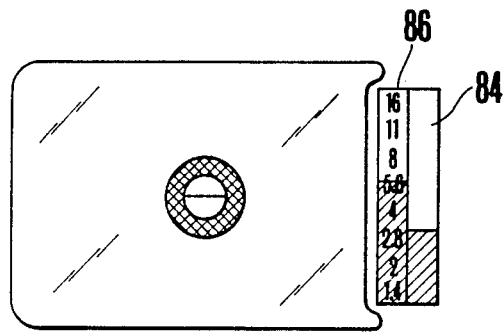
FIG. 23a
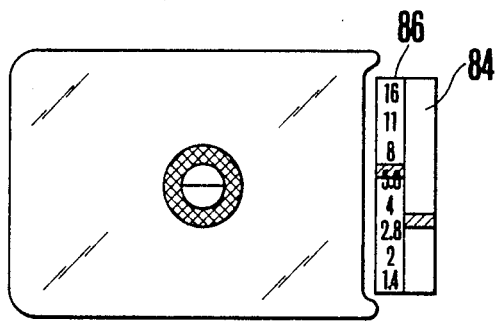
FIG. 23b
FIG. 25
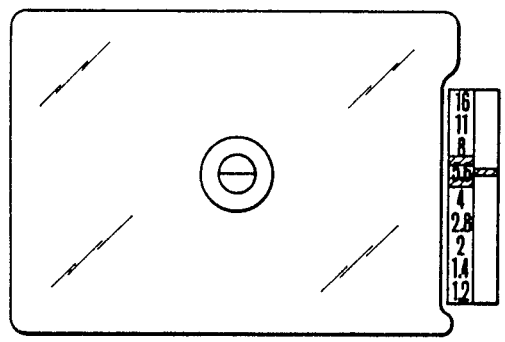

LIQUID CRYSTAL DISPLAY SYSTEM

This is a continuation of application Ser. No. 768,432 filed on Feb. 14, 1977, now abandoned.

BACKGROUND OF THE INVENTION

1. Field of the Invention

The present invention relates to a display system for displaying the analog information digitally by means of the liquid crystal with properties presenting an electro-optical effect.

2. Description of the Prior Art

Until now, in case the information amount is an analog amount, the ampere meter or the voltage meter has been used so as to carry out a stepless analog display by means of the movement of the finger. However, it has not been convenient for those who read out the information amount because the analog display can not be understood directly as numerical value. Thus the analog information amount has been converted into a digital information amount by means of an analog to digital converter so as to carry out the digital display with segment display members and so on. However, in case of these information amount display systems, the analog to digital converter or the digital driving circuit is needed in such a manner that the system is unavoidably complicated while the manufacturing cost is high, which is not profitable.

BRIEF SUMMARY OF THE INVENTION

Object of the Invention

An object of the invention is to offer a display system of simple composition capable of displaying an analog information amount in a digital way.

Another object of the present invention is to offer a display system presenting a liquid crystal and capable of displaying a plural number of analog information amount in a digital way.

Further another purpose of the present invention is to offer a simple composition capable of carrying out the conventional analog information display in a digital way.

The foregoing and other objects are effected by the invention as will be apparent from the following description and claims taken in connection with the accompanying drawings, forming a part of this application.

BRIEF DESCRIPTION OF THE DRAWINGS

FIG. 3 shows the driving circuit for the liquid crystal cell shown in FIGS. 1 and 2.

FIG. 4 shows the explanatory diagrams for the display method for the liquid crystal shown in FIGS. 1, 2 and 3.

FIGS. 5 and 6 respectively show the explanatory diagram for the variations of the liquid crystal display method in accordance with present invention.

FIG. 7 shows the first embodiment of the present invention applied so as to display the photographic informations in the view finder of the camera, whereby;

FIG. 8(a) shows the embodiment applied for another purpose, while

FIG. 16(a) shows another driving circuit of the third embodiment.

FIGS. 16(b), (c) and (d) respectively show the operation of the liquid crystal display method with the driving circuit shown in FIG. 16(a).

FIGS. 18(a) and (b) respectively show the state seen in the view finder of the camera in which the third embodiment is applied.

FIG. 19 shows the driving circuit for the second application of the third embodiment.

FIGS. 20(a) and (b) respectively show the operation of the liquid crystal display method in which the driving circuit for the second application is used.

FIG. 21 shows the state seen in the view finder of the camera, of the second application.

FIGS. 23(a) and (b) respectively show the state seen in the view finder of the camera, of the third embodiment shown in FIG. 22.

FIG. 25 shows the state seen in the view finder of the camera in which the driving circuit shown in FIG. 24 is used.

DESCRIPTION OF THE PREFERRED EMBODIMENTS

The present invention relates to a display method so designed that a liquid crystal presenting an electrooptical effect is sandwiched between the homogeneous and continuous electrode provided on the surface of the one of the base plates such as glass plates opposed to each other and the divided electrodes or the homogeneous and transparent resistance provided on the surface of the other of the base plates. Hereby for example, the nematic liquid crystal is known as the one that posesses such an electrooptical effect as alters optical properties when applied with an electrical pressure.

In the operation mechanism for liquid crystal cell consisting of liquid crystals with an electrooptical effect of the liquid crystal display method in accordance with the present invention there are two operation modes, namely DSM (Dynamic Scattering Mode) and FEM (Field Effect Modes). Further FEM can be divided into TN (Twisted Nematic) and DAP (D Formation of Aligned Phase of Nematic). These liquid crystal operation mechanisms are well known.

Figure 1:
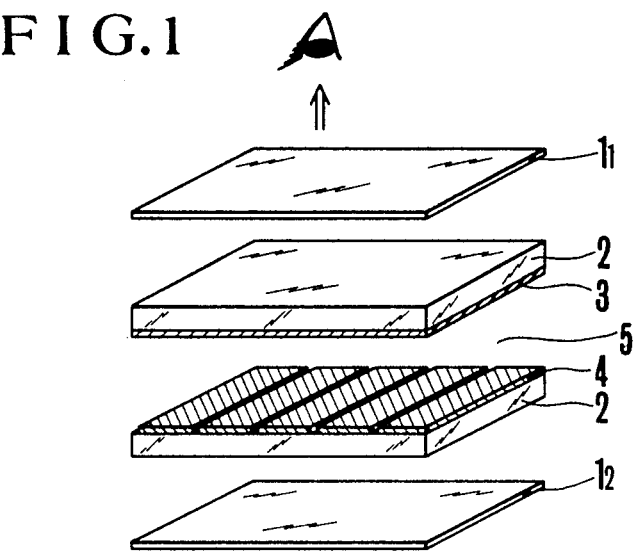
FIG. 1 shows the composition of the transparent type liquid crystal cell in accordance with the present invention.
Figure 2:
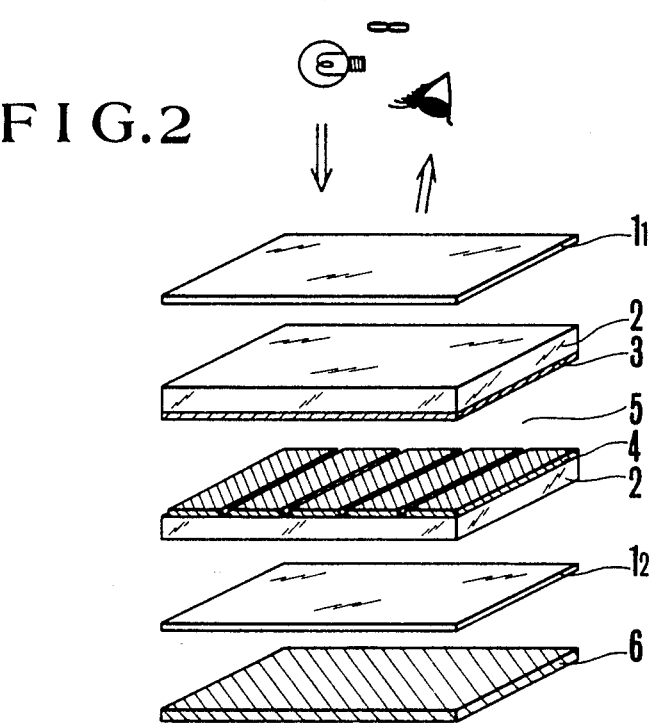
FIG. 2 shows the composition of the reflection type liquid crystal cell.

Below the present invention will be explained in accordance with the accompanying drawings of the embodiments. FIGS. 1 and 2 respectively show the composition of the liquid crystal cell applied for the liquid crystal display method in accordance with the present invention. In FIGS. 1 and 2, $1_1$ is a polarizer to be used as analyser, 2 a base plate consisting of proper material such as glass permitting the passage of the visible light, 3 a continuous transparent electrode supported on the base plate 2, consisting of for example tin oxide, indium oxide and so on and provided on the base plate for example by means of metalization. 4 is also the transparent electrode supported on the base plate 2, forming a divided transparent electrodes at a certain proper interval from each other. 5 is a space which is to be filled with the liquid crystal with an electrooptical effect and sandwiched between the transparent electrode 3 and the divided transparent electrodes 4 through a not shown spacer. $1_2$ is the polarizer. 6 is the reflection plate such as mirror, while 8 is the light source.

Below the FEM liquid crystal driving mechanism will be explained while the DSM driving mechanism will also do whereby the polarizer is not necessary.

FIG. 1 shows the liquid crystal cell in accordance with the present invention, whereby the penetrating light is used. Hereby the change of the brightness of the liquid crystal on the divided electrode 4 is observed by means of the light coming from beneath out of the light source. FIG. 2 shows the liquid crystal cell in accordance with the present invention, whereby the reflected light is used. The change of the brightness of the liquid crystal on the divided electrodes 4 is observed by means of the light coming from above out of the light source 8 and reflected by the reflecting plate 6. FIG. 3 shows the driving circuit applied to the liquid crystal display method in accordance with the present invention, whereby the members with the same figures as in FIGS. 1 and 2 are the same members. 10 shown in a dotted line is the liquid crystal cell shown in FIG. 1 or 2, presenting a continuous transparent electrode 3 and divided transparent electrode 4.

12 are the resistances presenting the same value, each being connected between the divided transparent electrodes adjacent to each other. 14 is the driving power source for applying the voltage $V_{AB}$ to the both terminals A and B of the divided transparent electrodes. In this way, an electrical potential is given to each of the divided transparent electrode in a way of step. 16 is the information output source for applying a voltage corresponding to the information to be displayed as analog amount to the divided transparent electrodes 3. The outputs of the information output source are the conventional analog informations such as the exposure informations of the camera (aperture value information, shutter time information, film sensitivity information), the information of the film still remaining in the camera, the voltage information and so on.

FIGS. 4(a), (b) and (c) respectively show the operation of the first embodiment of the liquid crystal display method shown in FIGS. 1-3.

FIG. 4(a) shows the potential inclination between the electrodes 3 and 4 sandwiching the liquid crystal shown in FIGS. 1 and 2, whereby the electrical potential 4a of the divided transparent electrodes 4 increases at an equal interval in a way of step. The electrical potential 3a of the continuous transparent electrode 3 is kept at the information output voltage Vc all over the surface when the information is delivered from the information output source 10. In the range Y in which the potential difference between the continuous transparent electrode 3 and the divided transparent electrodes 4 becomes larger than the electrooptical threshold Vth for optically operating the liquid crystal the optical modulation takes place so as to alter the intensity of the transparent light abruptly while in the range X in which the potential difference is smaller than Vth no optical modulation takes place.

The difference between the modulation range and the non-modulation range can be recognized as the difference between the display states, namely the negative-positive or the positive-negative by means of arranging two polarizers 1 with the polarization directions perpendicular to each other or parallel to each other. Hereby the negative portion means the range in which the polarizers 1 interrupt the penetrating or the reflected light, while the positive portion means the range in which neither the penetrating nor the reflected light is interrupted. FIG. 4(b) shows the optical non-modulation range X in the negative state while FIG. 4(c) shows the range X in the positive state, whereby the negative portion is shown in slant lines in both cases. Along with the change of the information output voltage Vc, the negative or the positive display range X moves in the liquid crystal incontinuously, whereby a divided transparent electrode in the optical non-modulation range X is exchanged for another adjacent divided transparent electrode successively in such a manner that the information output can be visually recognized.

FIGS. 4(d) and (e) respectively shows the change of the liquid crystal display when the information output of the information output source 16 changes. When as is shown in FIG. 4(a) the output voltage of the information output source is Vi the electrical potential of the continuous transparent electrode 3 is $3a'$. Along with the change of the electrical potential of the continuous transparent electrode 3 the modulation-non-modulation range in which the liquid crystal on the divided transparent electrodes 4 brings about the optical modulation is translated. Namely as is shown in FIGS. 4(d) and (e) the modulation-non-modulation range of the liquid crystal is translated in response to the output value of the information output source 16.

Hereby in order that at least one divided transparent electrode is contained in the display portion X when the potential difference between the divided transparent electrodes 4 adjacent to each other is $V_{AB}$, the following condition must be satisfied.

$$V_{AB} \leq 2 V_{th} \qquad (1)$$

Because the value of the resistances 11 is same, $$V_{AB} = V_{AB}/(n-1)$$

whereby n is the number of the divided transparent electrodes so that the relation (1) can be represented as follows:

$$V_{AB}/(n-1) \leq 2V_{th} \quad (2)$$

Further in order that the number of the divided transparent electrodes contained in the display portion X is less than 2, the following conditions must be satisfied.

$$V_{AB} > V_{th}$$

$$\therefore V_{AB}/(n-1) > V_{th} \quad (3)$$

In consequence, when the condition $$V_{th} < V_{AB}/(n-1) \leq 2V_{th} \quad (4)$$

is satisfied, one or two divided transparent electrodes are contained in the display range X. Hereby two divided transparent electrodes are contained in the display range X when the voltage Vc of the continuous transparent electrode 3 is the middle value of the electrical potentials of the adjacent transparent electrodes. Namely, by means of the fact that the two adjacent divided transparent electrodes are in the display range at the same time, it is displayed that the analog output of the afore mentioned information output source 16 is the middle value of the displays by means of the two adjacent divided transparent electrodes.

FIGS. 5(a) and (b) and FIGS. 6(a) and (b) respectively show the operation of the variation of the first embodiment of the liquid crystal display method in accordance with the present invention. In the present embodiment the display is carried out by means of the liquid crystal at the part corresponding to the one divided transparent electrode within the range in which the condition $$Vd - \tfrac{1}{2}V_{AB} 23 \; Vc \leq V + \tfrac{1}{2}V_{AB}$$

is satisfied between the electrical potential Vd of a certain determined divided transparent electrodes and the electrical potential Vc of the continuous transparent electrode, while the display is carried out by means of the liquid crystals at the parts corresponding to the two adjacent divided transparent electrodes within the range in which the condition $$Vd + \tfrac{1}{2}V_{AB} \leq Vc \leq Vd + \tfrac{3}{2}V_{AB}$$

is satisfied.

Namely, the display is carried out by means of the liquid crystals at the parts corresponding to the divided transparent electrodes $4_1$ and $4_2$ within the range in which the voltage Vc applied to the continuous transparent electrode 3 is between the level shown in FIG. 5(a) and the level shown in FIG. 6(a), whereby as is clear from the drawings $$V_{AB} = V_{AB}/(n-1) = (4/3)V_{th} \quad (5)$$

By means of setting the constant (4/3) in (5)) optionally it is possible to bring the two divided transparent electrode in the display range when the voltage Vc is within an optional middle value range.

Below actual applications of the first embodiment in accordance with the present invention will be explained.

Figure 7A:
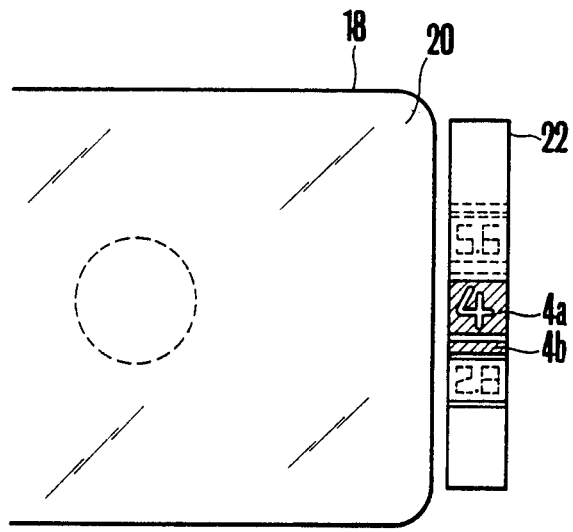
FIG. 7(a) shows the display state in the view finder.

FIGS. 7(a), (b) and (c) show the embodiment applied in the photographic information display in the view finder of a camera. In the drawing, 18 is the view field frame of the view finder, 20 the matt screen and 22 the photographic information display portion in which the liquid crystal cell in accordance with the present invention is arranged in the view finder optical system.

Figure 7B:
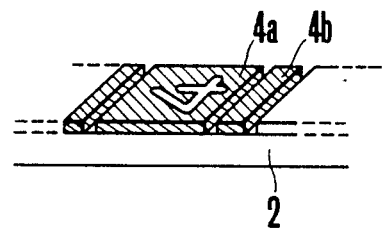
FIG. 7(b) shows the composition of a divided transparent electrode.
Figure 7C:
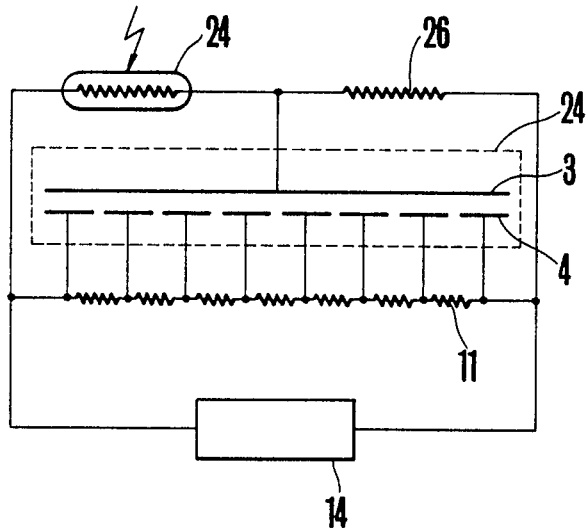
FIG. 7(c) shows the driving circuit.

In case of the present application, by making use of the liquid crystal cell so designed that divided transparent electrodes 4a in which a numerical figures for the photographic information such as the aperture value or the shutter time is provided and line shaped divided transparent electrodes 4b are alternatively cemented on a glass base plate 2 as is shown in FIG. 7(b), the display state as is shown in FIG. 7(a) is obtained. Hereby the line shaped display 4b means the middle value, whereby it is displayed that the proper exposure value is smaller than F 4. FIG. 7(c) shows the then driving circuit, whereby 24 is the light sensing element CdS and the voltage divided by the CdS and the resistance 26 is applied to the continuous transparent electrode 3 as the aforementioned voltage Vc so as to enable the light measurement display. Further as explained above either the positive display or the negative display is possible by arranging the two polarizers 1 with the polarization directions parallel to each other or perpendicular to each other.

Figure 8A:
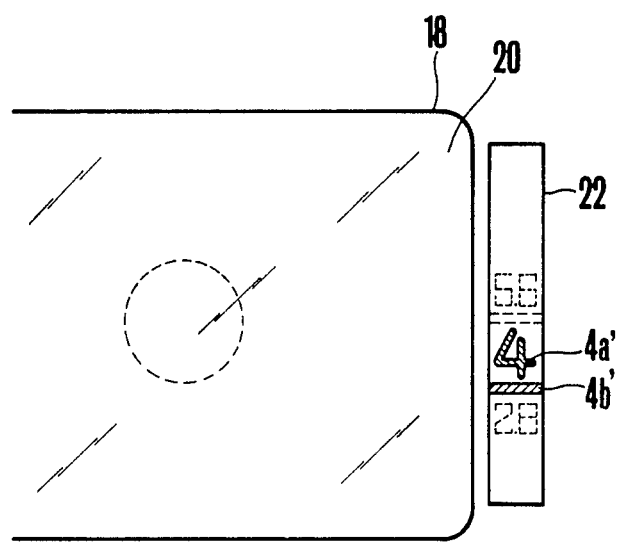
Figure 8B:
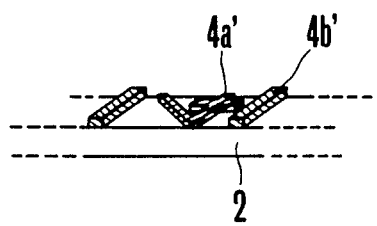
FIG. 8(b) shows the composition of the divided transparent electrode.

FIGS. 8(a) and (b) show another application, whereby as is shown in FIG. 8(b) the divided transparent electrodes 29 with a figure is cemented on the glass base plate 2 so as to obtain the display state as is shown in FIG. 8(a). The driving circuit can be the same as is shown in FIG. 7(c). Further as another application, on the transparent base plate either on or under the liquid crystal a member for displaying the numerical figure for the photographic information can be provided, whereby the composition of the liquid crystal can be simplified.

Below the second embodiment of the present invention will be explained.

As the display means in the photographic information display device, the finger of an ampere meter displaying the light measurement information of the object brightness has been made to coincide with the finger in functional engagement of the shutter time ring or aperture ring to be preset or the aperture values has been preset at the aperture value read out in the view finder, whereby the finger of the ampere meter has been made use of as the finger of the display means.

The above mentioned conventional display means includes several difficulties such as the decrease of the freedom of the space for installing the display means, the complication of the mechanical engagement mechanism and so on.

The purpose of the present embodiment is to offer a proper exposure setting device by means of the liquid crystal display without using any conventional ampere meter in order to eliminate the above mentioned shortcomings, being characterized in that two series of electrodes are provided for one liquid crystal cell in such a manner that the light measurement value and the preset value are displayed separately while further the two series of electrodes respectively include a continuous electrode and a plural number of the divided electrodes in such a manner that the display is carried out in a way of step whereby the continuous electrode and the divided electrodes are provided on both sides of the liquid crystal, that the wiring for supplying current to the one divided electrodes is provided between the other divided electrodes so as to make it possible to provide the wirings to the two series of the divided electrodes only at the one side of the liquid crystal while the continuous electrode opposed to the divided electrodes in the series in which the current supply wiring is provided between the divided electrodes is shaped in comb-form so as to eliminate the portion opposed to the above current supply wiring and to avoid the misdisplay.

Figure 9:
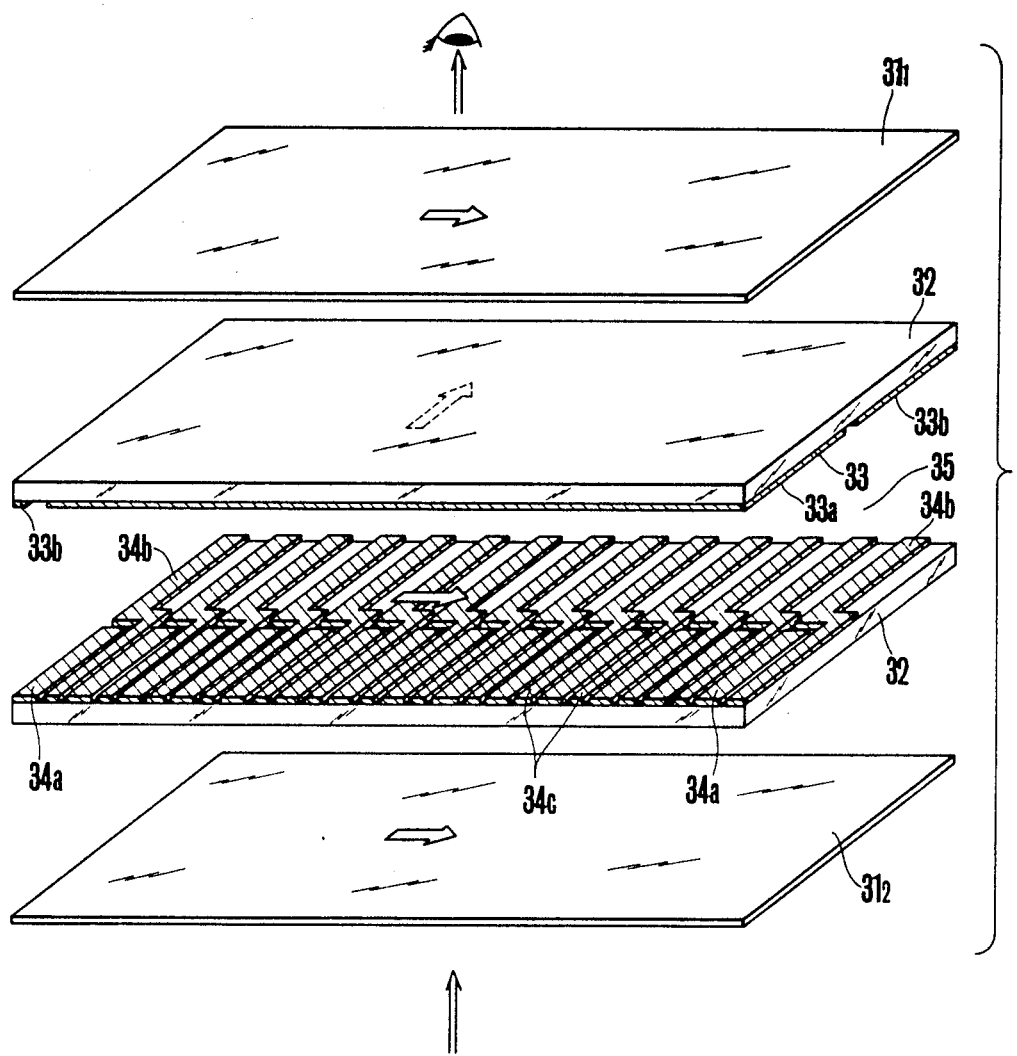
FIG. 9 shows the composition of the transparent type liquid crystal cell in the second embodiment of the liquid crystal cell display method in accordance with the present invention.

Below the second embodiment of the present invention will be explained in accordance with the accompanying drawings. FIG. 9 shows the composition of the liquid crystal cell applied to the present invention. $31_1$ is the polarizer used as analyzer, 32 the transparent base plate similar to that of the first embodiment and 33 the continuous transparent electrode supported on the layer 32, consisting of similar material to that of the first embodiment. The transparent electrode 33 shown in FIG. 10 includes two parallel series 33a and 33b, whereby the comb-shaped electrode series 33a is cemented on the base plate 32. 34a and 34b are respectively the transparent electrode divided into a plural number of electrode members, being arranged in two series so as to be opposed to the aforementioned continuous transparent electrodes 33a and 33b. 35 is the space to be filled with the liquid crystal with an electrooptical effect, sandwiched between the continuous transparent electrodes 33a, 33b and the divided transparent electrodes 34a, 34b through the not shown spacer. In FIG. 9, the molecules of the liquid crystal presenting an electrooptical effect and filled in the space 35 gradually enter into the distorted orientation between the continuous transparent electrodes 33a, 33b and the divided transparent electrodes 34a, 34b in such a manner that the molecules of the liquid crystals in contact with the continuous transparent electrodes 33a, 33b are oriented along the direction of the arrow shown on the continuous transparent electrodes in a dotted line while the molecules of the liquid crystal in contact with the divided transparent electrodes are orientated along the direction of the arrow shown on the divided transparent electrodes. The arrow on the polarizer $31_1$ represents the polarization plane of the polarizer. The upper polarizer $31_1$ is intended to detect the light coming out of the liquid cell. In FIG. 9, the molecules of the liquid crystal are in the 90° distorted state. In FIG. 9, the polarization plane of the light coming from the below is once arranged in accordance with the polarization plane of the polarizer $31_2$, rotated at the angle in accordance with the distorted orientation of the molecules of the liquid crystal and reaches the upper polarizer $31_1$. When the electrical field larger than the electrooptical threshold value Vth is applied to the molecules of the liquid crystal, the molecules of the liquid crystal are arranged with the major axis perpendicular to the base plate plane, whereby the liquid crystal is isotropic with reference to the incident light so that the polarization plane of the incident light is not rotated.

It goes without saying that not only the liquid crystal of FE (Field effect mode) as explained above but also the liquid of DSM mode (Dynamic scattering mode) controlled by a driving mechanism can be applied to the present embodiment.

Figure 10:
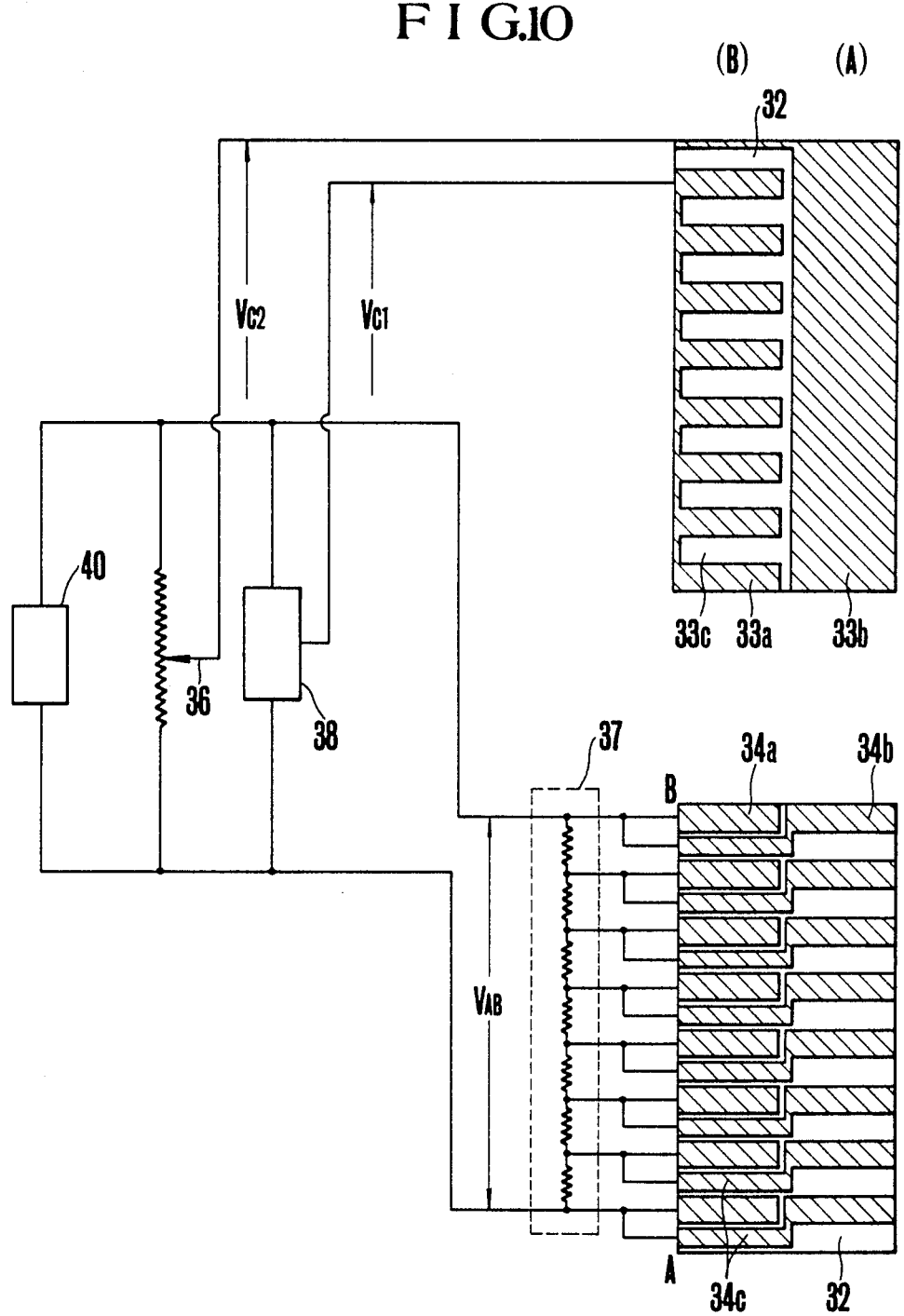
FIG. 10 shows the driving circuit of the second embodiment of the liquid crystal cell.

FIG. 10 shows the driving circuit for the proper exposure setting device in accordance with the present embodiment, in which the liquid crystal shown in FIG. 9 is applied. In the drawing, 37 shown in dotted line is a group of fixed resistance with equal value, being intended to give electrical potentials to the divided transparent electrode in a way of step. 36 is the variable resistance functionally engaged with the shutter time dial or the aperture value, being intended to produce the voltage $Vc_2$ corresponding to the preset photographic information. 38 is the light measuring circuit intended to produce the voltage $Vc_1$ corresponding to the object brightness. 34a and 34b are the afore mentioned divided transparent electrodes, whereby the electrodes 34c for supplying current to the divided transparent electrodes 34b are provided between the divided transparent electrodes 34a. The continuous transparent electrodes 33a, 33b present shapes as is shown in the drawing, whereby the spaces 33c are opposed to the electrodes 34c. The power source 40 delivers the voltage $V_{AB}$ to the divided transparent electrodes 34a, 34b. In the drawing the electrodes 33b are arranged at A side while the electrodes 33a are arranged at B side.

Figure 11A:
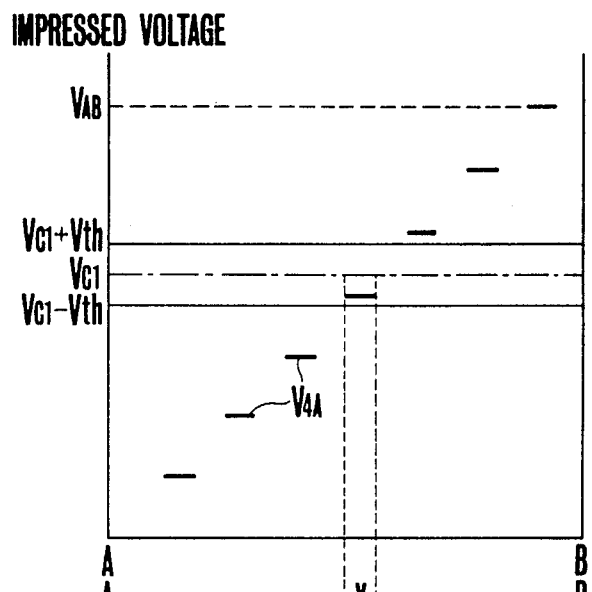
FIGS. 11(a), (b) and (c) respectively show the operation of the liquid crystal display method of the second embodiment.

FIGS. 11(a), (b) and (c) show the operation of the present embodiment shown in FIGS. 9 and 10.

Figure 11B:
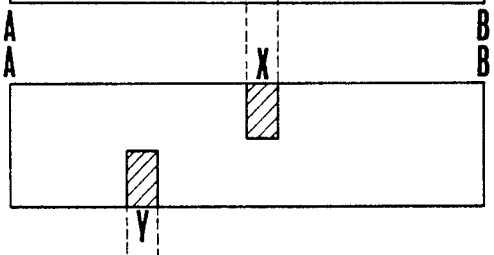

FIG. 11(a) shows the operation by means of the divided transparent electrodes in the series at the one side of the liquid crystal cell and the continuous transparent electrode 33a, whereby the electrical potential $V_{4a}$ of the divided transparent electrodes 34a is increased by a certain determined value in a way of step, while the electrical potential of the continuous transparent electrode 33a is kept at the output voltage $Vc_1$ of the light measuring circuit 38 all over the plane. The optical modulation takes place in the range in which the potential difference between the continuous transparent electrode 33a and the divided transparent electrode 34a is larger than the electrooptical threshold value Vth of the liquid crystal while the liquid crystal corresponding to the divided transparent electrodes in the range in which the potential difference is smaller than Vth brings about no optical modulation so that the display is carried out in accordance with the object brightness as is shown at X in FIG. 11(b). The difference between the modulation range and the non-modulation range can be recognized as the difference between the negative-positive display and the positive-negative display by means of arranging two polarizers with the polarization directions perpendicular to each other or parallel to each other. Hereby the negative portion means the range in which the penetrating light is interrupted by the polarizer 31 while the positive portion means the range in which the light is not interrupted. FIG. 11(b) shows the display state when the optical non-modulation range X is in the negative state. When the information output voltage Vc alters, a divided transparent electrode in the optical non-modulation range is naturally successively exchanged for the adjacent divided transparent electrode in such a manner that the display part X moves incontinuously in the liquid crystal cell.

Figure 11C:
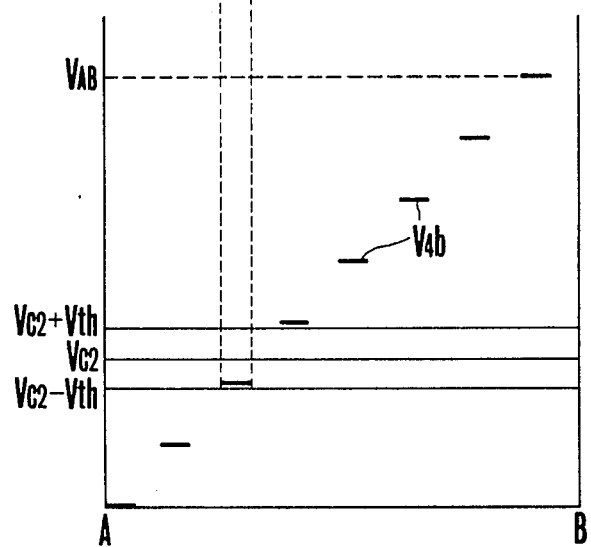

FIG. 11(c) shows the operation by means of the divided transparent electrodes 34b in another series and the continuous transparent electrode 33b. Also at this time in the same way as mentioned above, the liquid crystal at the part corresponding to the divided transparent electrodes in the range in which the potential difference between the output voltage $Vc_2$ of the variable resistance 36 and the electrical potential $V_{4b}$ of the divided transparent electrode is smaller than Vth displays the preset value of the shutter time or the aperture value as is shown at Y in FIG. 11(b). Hereby the setting is made so as to obtain the proper exposure when the preset value is determined in such a manner that the display part X coincides with that Y by adjusting the shutter time or the aperture in the same way as in case of the finger of the conventional ampere meter.

The display is carried out in a way of step in this way by means of the proper exposure setting device in accordance with the present embodiment so that the setting can be carried out in a easy way, whereby the light measurement value and the preset value can be displayed in one liquid crystal cell so that the display can be observed easily without joint while further it is sufficient to provide the wiring for the liquid crystal cell only at the one side so that the assembling can be carried out in an easy way. Further no ampere meter is necessary for other part than this display part so that only a small space already suffices, which is very profitable.

Figure 12:
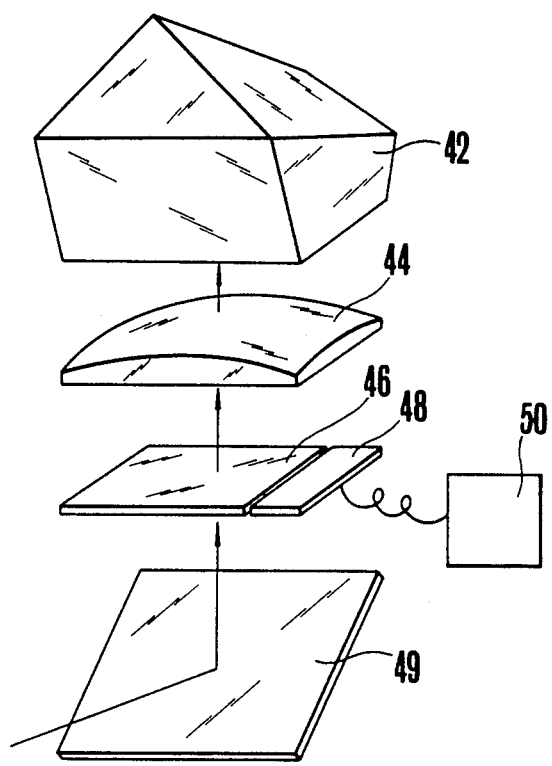
FIG. 12 shows the important members of the proper exposure setting device in accordance with the second embodiment built in a single reflex camera.
Figure 13:
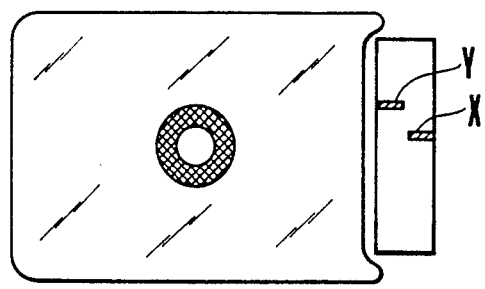
FIG. 13 shows the state seen in the view finder of the camera.

FIG. 12 shows the important members of the single reflex camera in which the proper exposure setting device in accordance with the present embodiment is built. In the drawing, 42 is the pentagonal prism, 44 the condenser lens, 46 the focusing screen, 48 the liquid crystal cell, 49 the reflecting mirror and 50 the driving circuit including the variable resistance for presetting, the light measuring circuit and so on. The liquid crystal cell 48 is provided beside the focusing screen at the position of the clear vision through the pentagonal prism. FIG. 13 shows the state seen in the view finder at this time. When the display Y of the preset value is made to coincide with the display X of the light measurement value by operating the shutter time ring or the aperture ring while observing the display, the proper exposure can be set. As maintained above, all of the external terminals of the transparent electrodes are provided on the one side of the glass transparent base plate, so that there is no danger that the connecting cord should project into the effective view field in the view finder and a display easy to observe can be obtained in the view finder.

Below the third embodiment in accordance with the present invention will be explained in accordance with the accompanying drawings as the application applied to the exposure information display device in the camera.

Figure 14:
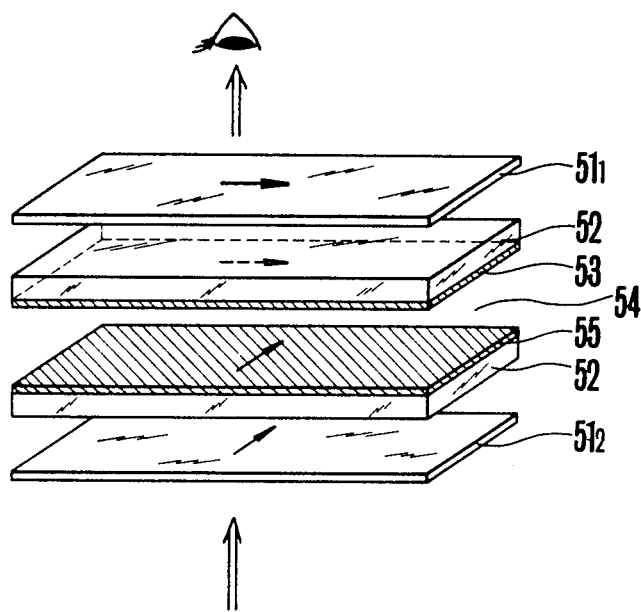
FIG. 14 shows the composition of the third embodiment of the present liquid crystal display method.

FIG. 14 shows the composition of the liquid crystal cell used as the display means in the present embodiment. $51_1$ is the polarizer used as analyzer, 52 the transparent base plate such as of glass, 53 the transparent electrode layer supported on the base plate 52 and 55 the homogeneous transparent resistance supported on the base plate 52, consisting of indium oxide, tin oxide, titan oxide and so on. 54 is the space to be filled with the liquid crystal, being sandwiched between the electrode layers through the spacer. In the present embodiment, the liquid crystal with properties similar to those of the aforementioned embodiment is used.

The liquid crystal cell shown in FIG. 14 makes use of the penetrating light, so designed that the liquid crystal receives the light from the not shown light source, penetrating the polarizer $51_2$ from below whereby the information produced with the electrooptical properties of the liquid crystal cell is observed. Further it is possible to observe the informations produced on the liquid crystal with the light from the not shown light source and incident on the polarizer $51_1$ from the above by providing a reflecting plate (for example a mirror) under the polarizer $51_2$ in the liquid crystal cell composed as shown in FIG. 14.

In FIG. 14, the molecules of the liquid crystal presenting the electrooptical effect and filled in the space 54 enter gradually into the distorted state between the transparent electrode 53 and the transparent resistance 55, whereby the molecules of the liquid crystal in contact with the transparent electrode 53 are orientated along the direction of the arrow shown in a dotted line on the transparent electrodes 53 while the molecules of the liquid crystal in contact with the transparent resistance 55 are orientated along the direction of the arrow shown on the transparent resistance. The arrow on the polarizer 51 represents the polarization plane. The upper polarizer $51_1$ is intended to detect the light from the liquid crystal cell. In FIG. 14, the orientation of the molecules of the liquid crystal is in the 90° distorted state. The polarization plane of the light coming from the below is arranged in accordance with the polarization plane of the polarizer $51_1$, and rotated by the angle of the distortion of the orientation of the molecules of the liquid crystal between the resistance 55 and the electrode 53 through which crystal the light passes in such a manner that the light reaches the polarizer $51_1$. When an electrical field which is larger than the threshold value Vth for realizing the electrooptical effect is applied to the molecules of the liquid crystal, the molecules are arranged with the major axis perpendicular to the base plate plane, whereby the liquid crystal is isotropic with reference to the incident light so that there takes place no rotation of the polarization plane of the incident light. Hereby it goes without saying that not only the liquid crystal of FE type (Field effect mode) but also the liquid crystal of DSM type (Dynamic scattering mode) driven by a driving mechanism and so on can be applied to the present embodiment.

Figure 15:
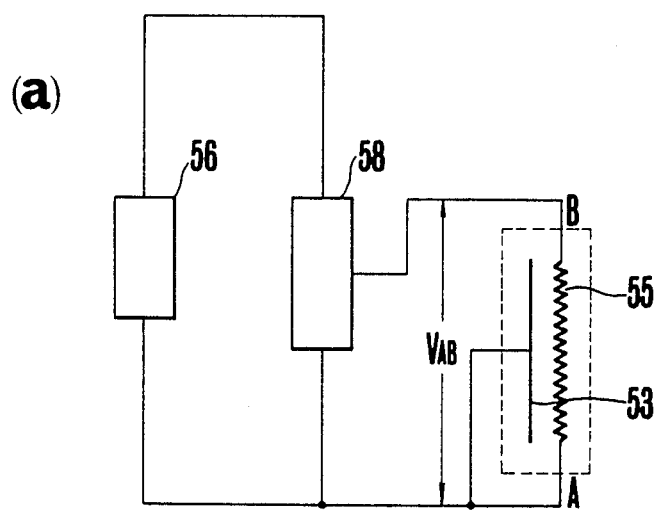
FIG. 15(a) shows the driving circuit of the third embodiment of the liquid crystal cell.
FIGS. 15(b), (c), (d), (e), (f), (g) and (h) respectively show the operation of the third embodiment.
Figure 15B:
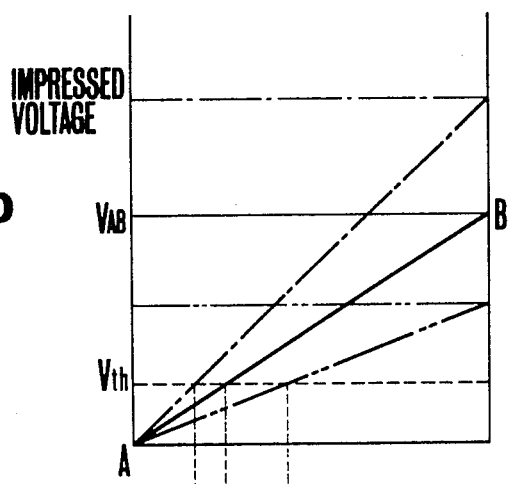
Figure 15C:
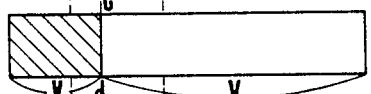
Figure 15D:
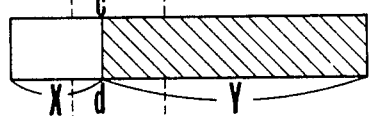

FIGS. 15(a), (b), (c), (d), (e), (f), (g) and (h) show the driving method of the liquid crystal. FIG. 15(a) shows an embodiment of the driving circuit, whereby 56 is the power source and 58 the information output source producing a voltage corresponding to the photographic information such as the preset value, the object brightness value and so on whereby the output of the source is delivered to both terminals of the afore mentioned homogeneous transparent resistance while the transparent electrode 53 is connected to the one terminal of the afore mentioned transparent resistance. At this time the voltage $V_{AB}$ is applied to the homogeneous transparent resistance 55, so that an electrical potential inclination as is shown with a straight line AB in FIG. 15(b) takes place in such a manner that an optical modulation takes place in the range Y in which the potential difference between the homogeneous transparent resistance 55 and the transparent electrode 53 is larger than the electrooptical threshold value Vth of the liquid crystal while no optical modulation takes place in the range X in which the potential difference between the homogeneous transparent resistance 5 and the transparent electrode 3 is smaller than the value Vth. The difference between the modulation range and the non-modulation range can be recognized as the difference between the negative-positive display state and the positive-negative display state by means of arranging the two polarizers 51 with the polarization plane perpendicular to each other or parallel to each other. Hereby the negative part means the range in which the penetrating or the reflected light is interrupted with the polarizer 51 while the positive part means the range the light is not interrupted. When the voltage $V_{AB}$ is varied, the inclination of the straight line AB shown in FIG. 15(b) is varied so that the boundary cd between the positive part and the negative part of the liquid crystal is translated in accordance with the voltage $V_{AB}$ in such a manner that the variation of the voltage $V_{AB}$ can be recognized as the variation of the length of the positive part or the negative part in form of rod. FIG. 15(c) shows the display state whereby the optical modulation range is positive while FIG. 15(d) shows the display state whereby the optical modulation range is negative. Hereby the negative part is shown in slant lines.

Figure 15E:
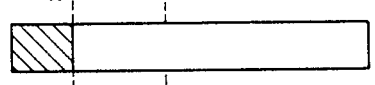
Figure 15F:
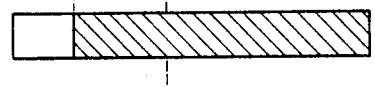
Figure 15G:
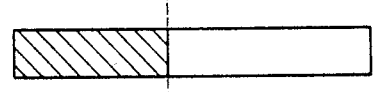
Figure 15H:

FIGS. 15(e), (f), (g) and (h) show the translation of the negative part or the positive part in the liquid crystal in accordance with the variation of the voltage $V_{AB}$ corresponding to the variation of the output of the information output source 58.

FIGS. 16(a), (b), (c) and (d) show another driving method of the liquid crystal in accordance with the present embodiment. FIG. 16(a) shows the driving circuit. The output of the information output source 58 is applied to the transparent electrode 53. When the voltage $V_{AB}$ of the power source 56 is applied to both terminals of the homogeneous transparent resistance whereby the information output voltage Vc is within the voltage $V_{AB}$ of the power source 56, the electrical potential inclination as is shown in FIG. 16(b) is obtained in such a manner that no optical modulation takes place in the range in which the potential difference between the homogeneous transparent resistance 55 and the transparent electrode 53 is smaller than the value Vth. When the voltage $V_{Ab}$ is chosen sufficiently large, the inclination of AB becomes large so that the width of the non-modulation range X becomes narrow so as to be recognized in form of rod, which rod is translated in the liquid crystal in proportion to the voltage Vc. Namely in this case the variation of the voltage Vc is recognized as the translation of the non-modulation range X so as to be able to realize the line-shaped display. In the same way, as in the aforementioned case the non-moduation range X can be displayed in the negative state or the positive state by means of the two polarizer 51 with the polarization direction perpendicular to each other or parallel to each other as is shown in FIGS. 16(c) or (d).

Figure 17:
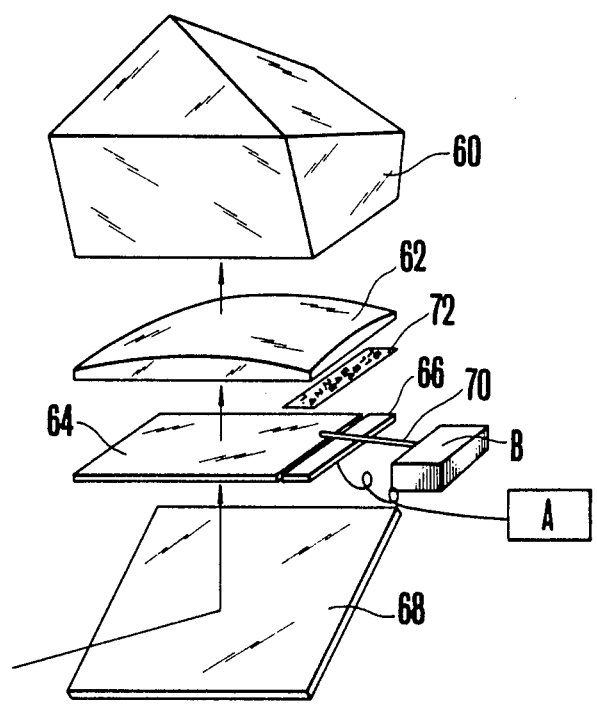
FIG. 17 shows the third embodiment applied to the proper exposure setting device of the camera.

FIG. 17 shows the first application of the present embodiment to the proper exposure setting device, whereby the liquid crystal in accordance with the third embodiment is built in the optical system of a single reflex camera. In the drawing, 60 is the pentagonal prism, 62 the condenser lens, 64 the focusing screen, 66 the aforementioned liquid crystal cell, 68 the reflecting mirror, 70 the follow finger and A the driving circuit of the liquid crystal being connected to the light measurement circuit in this case, whereby the liquid crystal displays the light measurement information. B is the mechanical part for driving the follow finger 70, being functionally engaged with the shutter time ring or aperture ring. 72 is a transparent member such as of cellophane bearing the aperture value or the shutter time value, being provided on the upper surface of the aforementioned liquid crystal cell. FIG. 18 shows the state seen in the view finder. FIG. 18(a) shows the case in which the liquid crystal cell for the rod-shaped display is used, while FIG. 18(b) shows the case in which the liquid crystal cell for the line-shaped display is used. The preset value is set so as to be able to obtain the proper exposure by means of operating the aperture ring or the shutter time ring in such a manner that the follow finger 70 is set on the boundary between the negative part and the positive part of the rod-shaped display in case of FIG. 18(a) and in such a manner that the follow finger 70 is set on the line-shaped display part in case of FIG. 18(b).

In the present application the liquid crystal cell displays the light measurement information whereby the follow finger in functional engagement with the aperture ring or the shutter time ring is set, whereby it is also possible to obtain the proper exposure by setting the finger of the ampere meter at the display part of the liquid crystal by means of so designing the driving circuit of the liquid crystal that the liquid crystal cell displays the preset value, by providing the finger of the ampere meter for displaying the information of the object brightness instead of the aforementioned follower finger and the variable resistance in functional engagement of the shutter time ring or the aperture ring.

Below the second application of the present embodiment will be explained.

FIG. 19 shows the driving circuit for the liquid crystal used in the present application, whereby 74 is the photoconductive element such as CdS for sensing the light from the objective, 76 the voltage source for producing periodic waves such as rectangular waves, sinusoidal waves and so on and 66 the liquid crystal cell with the same properties and the same composition as that of the crystal shown in FIG. 14, whereby the liquid crystal 66 displays the information corresponding to the output of the photoconductive element 74 sensing the light from the object. 78 is the switching means for periodically changing over the M terminal and the N terminal. 80 is the constant voltage producing means consisting of two series of diodes, whereby the one series consists of diodes connected in series along the forward direction while the other series consists of diodes connected in series along the reverse direction. R is the variable resistance provided between the voltage source 76 for producing periodic waves and the constant voltage producing means 80.

FIGS. 20(a) and (b) show the operation of the second application. The electrical potential of the transparent electrodes 53 is periodically varied by a certain determined voltage drop $\Delta Vc$ by means of the constant voltage producing means 80, whereby in accordance with the variation of the electrical potential the optical modulation range and the optical non-modulation range of the liquid crystal in the liquid crystal cell are varied in such a manner that the display $X_1$ and the display $X_2$ are alternatively repeated in accordance with the frequency of the switching means 78 as is shown in FIG. 20(b).

By means of chosing the frequency of this switching means 78 sufficiently short, the display $X_1$ and the display $X_2$ can visually be recognized simultaneously.

FIG. 21 shows the display state when the present application is applied to the optical system of a single reflex camera. The driving circuit for the liquid crystal shown in FIG. 19 is so designed that the proper exposure information value corresponding to the object brightness comes between the display $X_1$ and the display $X_2$. Hereby it is possible to offer the display easy to operate in the view finder by means of operating the shutter time ring and the aperture ring so as to bring the follow finger 70 between the display $X_1$ and the display $X_2$.

Figure 22:
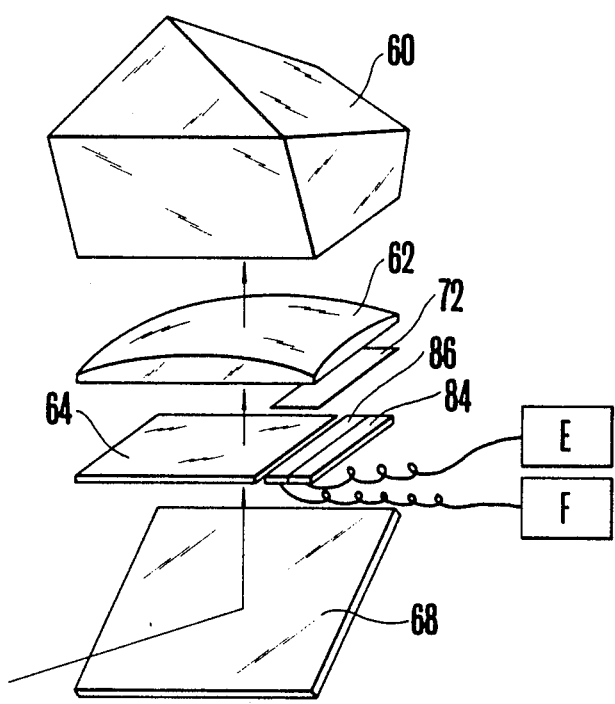
FIG. 22 shows the third application of the third embodiment of the liquid crystal display method in accordance with the present invention, being applied in the optical system of the camera.

Below the third application of the third embodiment will be explained. FIG. 22 shows the composition of the third application, whereby the display of the light measurement as well as the display of the preset shutter time or the preset aperture can be carried out by means of the liquid crystal cells. In the drawing, the members with same figures as that of the afore mentioned member are the same members. 84 and 86 are the liquid crystal cell, whereby the liquid crystal cell 84 is connected to the light measuring circuit E so as to display the light measurement information while the liquid crystal cell 86 is connected to the driving circuit F consisting of the variable resistance functionally engaged with the shutter time ring or the aperture ring so as to display the preset value of the shutter time or the aperture. FIG. 23 shows the state seen in the view finder at this time. In FIG. 23(a) the liquid crystal cell for the rod-shaped display is used while FIG. 23(b) the liquid crystal cell for the line-shaped display is used. In both cases the proper exposure can be obtained by making the display part of the liquid crystal cell 86 with the light measurement display part of the liquid crystal cell 84.

Below another application of the present invention will be explained, whereby by making use of the liquid crystal cell in which two series of the electrodes in accordance with the second embodiment are provided the display of the liquid crystal is made to twinkle repeatedly by means of the periodic wave producing means, the switching means and so on and the display of the photographic information of the camera is made in a way of follow needle.

Figure 24:
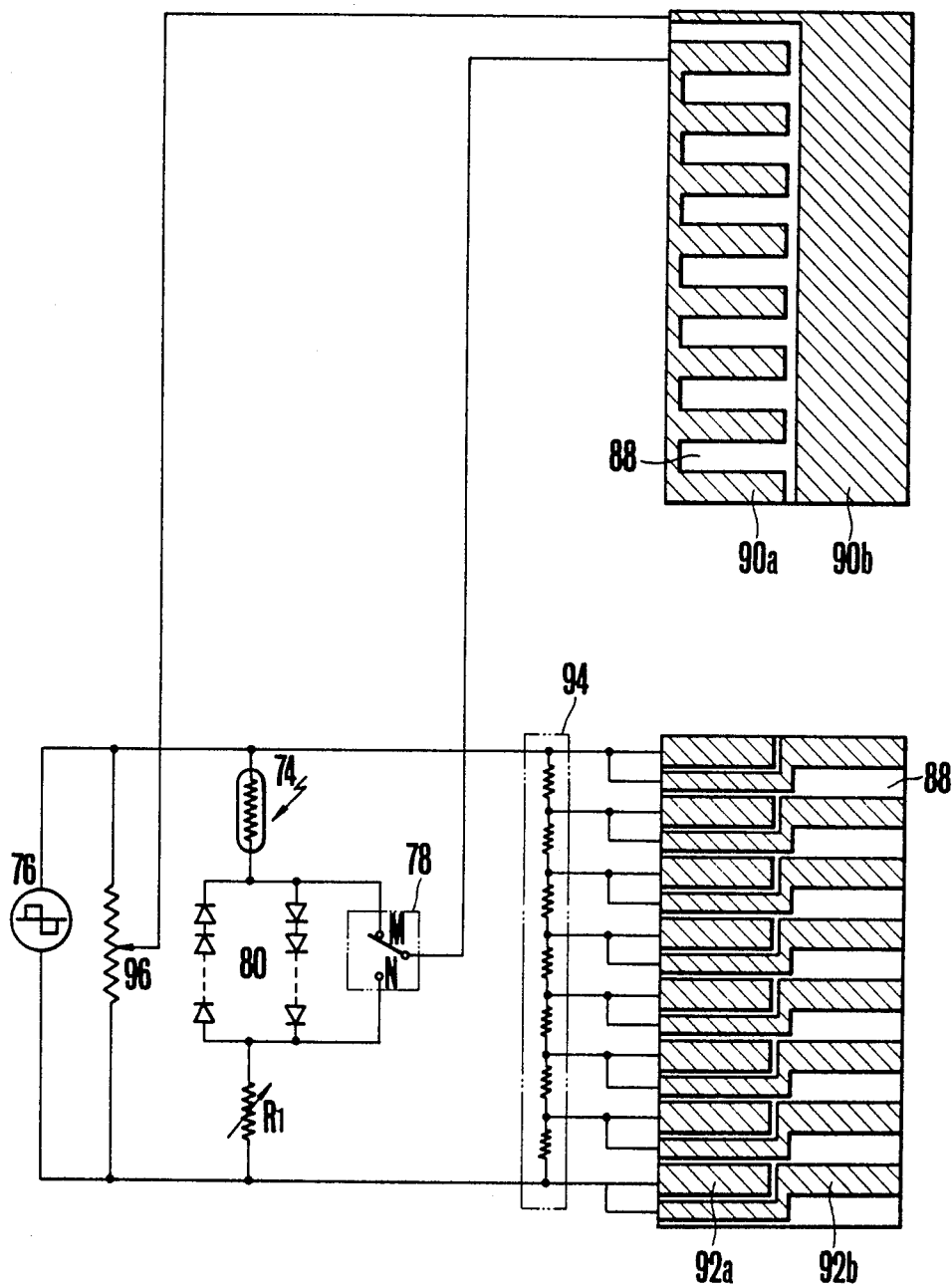
FIG. 24 shows the driving circuit for another application of the liquid crystal display method in accordance with the present invention.

In FIG. 24, 74 is the light sensing element such as of CdS for sensing the light from the object and 76 the periodic wave producing means for producing the rectangular waves, the sinusoidal waves and so on. 78 is the switching means being periodically changed over between the M terminal and the N terminal. 80 is the constant voltage producing means consisting of two series of diodes, whereby the one series consists of the diode connected in series along the forward direction while the other series consists of the diodes connected in series along the reversed direction. $R_1$ is the variable resistance for voltage adjusting. 88 is the transparent base plate and 90a and 90b the continuous transparent electrodes provided parallelly to each other, whereby the electrode 90b is provided at the side A while the electrode 90a is provided at the side B. Hereby 90a is comb-shaped, 92a and 92b are respectively a transparent electrode divided into a plural number of members, being arranged in two series so as to be opposed to the afore mentioned continuous transparent electrodes. Hereby the divided transparent electrode 92a can be a transparent resistance. 94 is the group of fixed resistances with equal resistance value, each being provided between the adjacent divided transparent electrodes so as to deliver the stepwise electrical potential. The resistance group 94 is not necesssary when 92a is a transparent resistance. 96 is the information input source such as variable resistance functionally engaged with the input means of the photographic information (shutter time, the aperture value and so on) of the camera. The variable resistance produces a voltage corresponding to the preset photographic information. In the driving circuit shown in FIG. 24, the stepwise electrical potentials are produced at the divided electrode 92a by means of the group 94 of the fixed resistances and the voltage drop is realized by the constant voltage producing means 80. In the display part at the side A of the liquid crystal cell, the same display as is shown in FIG. 20(b) is carried out by means of the periodic waves producing means 76, the switching means 78 and so on. On the comb-shaped transparent electrodes of the liquid crystal cell, the liquid crystal display is carried out, as is shown in FIGS. 4(b) and (a), in accordance with the input from the information input source 96. The liquid crystal display on the comb-shaped transparent electrode varies in a way of step in accordance with input from the information input source.

FIG. 25 shows the state visually recognized in the view finder of the liquid crystal display system as is shown in FIG. 24. In the present application, by means of adjusting the adjusting resistance $R_1$, the liquid crystal display at the side A of the continuous transparent electrode A can be carried out in the same way as that of the display parts $X_1$ and $X_2$ shown in FIG. 20 and FIG. 21. Namely, the preset photographic information (exposure information) corresponding to the object brightness is displayed between the display parts $X_1$ and $X_2$. Thus, by means of operating the input means of the photographic information input source 96 in such a manner that the display at the side B of the comb-shaped transparent electrode is carried out between the display parts $X_1$ and $X_2$, the display of the photographic information in the view finder can be used in the way of the follow finger system. In the present application, the wiring of the liquid crystal driving circuit are provided only at the one side of the liquid crystal cell as is shown in FIG. 24. Thus, even if the present liquid crystal cell system is provided in the neighborhood of the view finder of the camera, there is no difficulty for the wiring, which is profitable in order to realize compact cameras and so on.

As explained so far by means of the liquid crystal display system in accordance with the present invention the analog information is displayed in a way of step with the liquid crystal so as to be displayed digitally. Consequently it is no more necessary to treat the analog informations with the ampere meter, the complicated movable mechanism, the A-D converter and so on. Further the liquid crystal cell to be applied to the present invention can be composed sufficiently compact as compared with the ampere meter, the A-D converter and so on, while a small driving energy already suffices so that in comparison with the conventional display system, the present liquid crystal display system present a large superiority from the view point of designing, production and maintenance. This superiority has so far been explained in accordance with the embodiment as well as the application to the camera of the liquid crystal display system in accordance with the present invention, whereby it goes without saying that the present invention can be applied to the display system of other equipment from the view point of the technical nature and the effect.

What is claimed is:

1. A liquid crystal display system to display photographic information of a camera, comprising:
   (A) a liquid crystal device including:
   (a) a continuous transparent first electrode and a first transparent base plate which transmits light for supporting said electrode;
   (b) a plurality of transparent second electrodes, a second transparent base plate for supporting the second electrodes with intervals from each other;
   (c) a liquid crystal material sandwiched between said continuous transparent first electrode and said second electrodes and arranged to exhibit an electro-optical effect;

(B) resistance means including a plurality of resistors connected in series, each one of said resistors being connected between the second electrodes;

(C) power means to supply power to said resistance means; and (D) information output means for applying an electrical signal corresponding to exposure information of a camera to said continuous transparent first electrode;

(E) the electrical signal corresponding to exposure information and being applied to said continuous transparent electrode in the liquid crystal display system having a relationship to the power means impressed to both ends of said resistance means such that only a portion or zone of the above-mentioned transparent electrode can be visually recognized.

2. A liquid crystal display device as in claim 1, which satisfies the following relation:

$$Vth < V_{AB}/(n-1) \leq 2Vth$$

wherein Vth represents a threshold value at which an electro-optical effect takes place, and n represents a number of the above-mentioned divided transparent electrodes, while $V_{AB}$ represents a difference between the maximum and minimum levels of a step gradient among the divided transparent electrodes.

3. A liquid crystal display device as in claim 1, wherein said transparent second electrodes are cut into shapes of numerical values representing photographic exposure factors.

4. A liquid crystal display device as in claim 1, wherein said information output means includes a light receiving element to measure a brightness of an object to be photographed and to produce an electrical signal corresponding to the object brightness from said information output means, so as to effect an information display corresponding to the object brightness.

5. A liquid crystal display system to display photographing information of a camera, comprising:

(A) a liquid crystal device including:
  (a) a continuous transparent first electrode and a first transparent base plate which transmits light for supporting said electrode;
  (b) a plurality of transparent second electrodes, a second transparent base plate for supporting the second electrodes with intervals from each other;
  (c) a liquid crystal material sandwiched between said continuous transparent first electrode and said second electrodes and arranged to exhibit an electro-optical effect;

(B) resistance means including a plurality of resistors connected in series, each one of said resistors being connected between each of the second electrodes;

(C) power means to supply power to said resistance means; and (D) information output means for applying an electrical signal corresponding to exposure information of a camera to said continuous transparent first electrode;

(E) the electrical signal corresponding to exposure information and being applied to said continuous transparent electrode in the liquid crystal display system having a relationship to the power means such that only a portion of zone of the above-mentioned transparent electrode can be visually recognized;

(F) said transparent second electrodes being cut into shapes of numerical values representing photographic exposure factors;

(G) the transparent second electrodes being arranged so that small size electrodes and large size electrodes are sectioned alternately and the shape of numerical values are formed in the large size, while the small sizes form an intermediate value display.

6. A liquid crystal display device as in claim 5, which satisfies the following relation:

$$Vth < V_{AB}/(n-1) \leq 2Vth$$

wherein Vth represents a threshold value at which an electro-optical effect takes place, and n represents a number of the above-mentioned divided transparent electrodes, while $V_{AB}$ represents a difference between the maximum and minimum levels of a step gradient among the divided transparent electrodes.

7. A liquid crystal display device as in claim 5, wherein said information output means includes a light receiving element to measure a brightness of an object to be photographed and to produce an electrical signal corresponding to the object brightness from said information output means, so as to effect an information display corresponding to the object brightness.

8. A liquid crystal display system to display photographic information of a camera, comprising:

(A) a liquid crystal device including:
  (a) a continuous transparent first electrode and a first transparent base plate which transmits light for supporting said electrode;
  (b) a plurality of transparent second electrodes, a second transparent base plate for supporting the second electrodes with spaces between them;
  (c) a liquid crystal material sandwiched between said continuous transparent first electrode and said second electrodes and arranged to exhibit an electro-optical effect;

(B) resistance means including a plurality of resistors connected in series, each one of said resistors being connected between the second electrodes;

(C) power means to supply power to said resistance means; and (D) information output means for applying an electrical signal corresponding to exposure information of a camera to said continuous transparent first electrode;

(E) the electrical signal corresponding to exposure information having a relationship to the power means such that only a portion or zone of the transparent electrode can be visually recognized.

9. A liquid crystal display device as in claim 8, which satisfies the following relation:

$$Vth < V_{AB}/(n-1) \leq 2Vth$$

wherein Vth represents a threshold value at which an electro-optical effect takes place, and n represents a number of the above-mentioned divided transparent electrodes, while $V_{AB}$ represents a difference between the maximum and minimum levels of a step gradient among the divided transparent electrodes.

10. A liquid crystal display device as in claim 8, wherein said second electrodes include numerical-figure shaped electrodes having numerical values representing photographic exposure factors.

11. A liquid crystal display device as in claim 8, wherein said information output means includes a light receiving element to measure a brightness of an object to be photographed and to produce an electrical signal corresponding to the object brightness from said information output means, so as to effect an information display corresponding to the object brightness.

12. A liquid crystal display system to display photographic information of a camera, comprising:
(A) a liquid crystal device including:
  (a) a continuous transparent first electrode and a first transparent base plate which transmits light for supporting said electrode;
  (b) a plurality of transparent second electrodes, a second transparent base plate for supporting the second electrodes, said second electrodes including numerical-figure shaped electrodes and other electrodes each arranged between the numerical-figure shaped electrodes so as to indicate values intermediate the figures;
  (c) a liquid crystal material sandwiched between said continuous transparent first electrode and said second electrodes and arranged to exhibit an electro-optical effect;
(B) resistance means including a plurality of resistors connected in series, each one of said resistors being connected between the second electrodes;
(C) power means to supply power to said resistance means; and
(D) information output means for applying an electrical signal corresponding to exposure information of a camera to said continuous transparent first electrode;
(E) the electrical signal corresponding to exposure information having a relationship to the power means such that only a portion or zone of the transparent electrode can be visually recognized.

13. A liquid crystal display device as in claim 12, which satisfies the following relation:

$$V_{th} < V_{AB}/(n-1) \leq 2V_{th}$$

wherein $V_{th}$ represents a threshold value at which an electro-optical effect takes place, and n represents a number of the above-mentioned divided transparent electrodes, while $V_{AB}$ represents a difference between the maximum and minimum levels of a step gradient among the divided transparent electrodes.

14. A liquid crystal display device as in claim 12, wherein said information output means includes a light receiving element to measure a brightness of an object to be photographed and to produce an electrical signal corresponding to the object brightness from said information output means, so as to effect an information display corresponding to the object brightness.

15. A liquid crystal display system to display photographing information of a camera, comprising:
(A) a liquid crystal device including:
  (a) a continuous transparent first electrode and a first transparent base plate which transmits light for supporting said electrodes;
  (b) a plurality of transparent second electrodes and a second transparent base plate for supporting the second electrodes, said second electrodes including numerical-figure shaped electrodes with other electrodes arranged between the numerical-figure shaped electrodes so as to indicate values intermediate the figures;
  (c) a liquid crystal material sandwiched between said continuous transparent first electrode and said second electrodes and arranged to exhibit an electro-optical effect;
(B) resistance means including a plurality of resistors connected in series, each one of said resistors being connected between the second electrodes;
(C) power means for supplying power to said resistance means; and
(D) information output means for applying an electrical signal corresponding to exposure information of a camera to said continuous transparent first electrode.

* * * * *